United States Patent
Beidas et al.

(10) Patent No.: US 7,526,051 B1
(45) Date of Patent: Apr. 28, 2009

(54) METHOD AND SYSTEM FOR INTERFERENCE CANCELLATION FOR HIGH SPECTRAL EFFICIENCY SATELLITE COMMUNICATIONS

(75) Inventors: Bassel F. Beidas, Alexandria, VA (US); Stanley E. Kay, Rockville, MD (US); A. Roger Hammons, Jr., North Potomac, MD (US)

(73) Assignee: Hughes Network Systems, Inc., Germantown, MD (US)

( * ) Notice: Subject to any disclaimer, the term of this patent is extended or adjusted under 35 U.S.C. 154(b) by 0 days.

(21) Appl. No.: 09/401,694

(22) Filed: Sep. 23, 1999

Related U.S. Application Data (60) Provisional application No. 60/108,093, filed on Nov. 12, 1998.

(51) Int. Cl.
 *H04B 1/10* (2006.01)
 *H04L 1/00* (2006.01)
(52) U.S. Cl. ...................................... 375/349; 375/350
(58) Field of Classification Search ................. 375/346, 375/349, 350
See application file for complete search history.

(56) References Cited

U.S. PATENT DOCUMENTS 6,496,534 B1 * 12/2002 Shimizu et al. ............. 375/148

* cited by examiner

*Primary Examiner*—David B Lugo
(74) *Attorney, Agent, or Firm*—K & L Gates LLP (57) ABSTRACT

Systems and methods for interference cancellation for high spectral efficiency satellite communications enabling efficient utilization of available bandwidth through overlapping adjacent channels. Data information is received along with noise information, and a filter bank is adapted to receive and filter the waveform and output channel information including a combination of data signals and adjacent channel interference signals. The filter bank is further adapted to provide estimated data signals and to calculate estimated interference signals. One or more interference generating processors are adapted to receive the calculated estimated interference signals to enable the interference generating processor to generate interference signals corresponding to the calculated estimated interference signals. The interference generating processor subtracts the interference signals from the estimated data signals in order to output relatively more accurate estimated data signals. A decision device is provided for use with the interference generating processors for estimating data signals in accordance with the relative ability of the interference processor to cancel interference with the estimated interference signals.

14 Claims, 6 Drawing Sheets

METHOD AND SYSTEM FOR INTERFERENCE CANCELLATION FOR HIGH SPECTRAL EFFICIENCY SATELLITE COMMUNICATIONS

CROSS-REFERENCE TO RELATED APPLICATION

This application claims benefit of U.S. provisional application Ser. No. 60/108,093, filed Nov. 12, 1998.

BACKGROUND OF THE INVENTION

1. Field of the Invention

The present invention relates generally to satellite communications and, more particularly, interference cancellation in narrowband satellite systems.

2. Description of the Related Art

Efficient use of available bandwidth in wireless, such as satellite, communications applications is a problem of paramount importance. This is particularly true of narrow band satellite applications wherein bandwidth is very limited. An example of such a narrow band satellite includes very small aperture terminal (VSAT) systems. VSAT systems use compact earth stations that are installed at one or more customer's premises to provide links among the premises over a wide coverage area. Typically, in such systems, remote ground terminals are used for communicating via a geosynchronous satellite from a remote location to a central hub station or other remote locations. The central hub station communicates with multiple remote ground terminals. VSAT systems are used to handle customer network requirements, from small retail sites up to major regional offices, and can support two-way data, voice, multi-media, and other types of data. A particular advantage of these systems is their relatively low site cost and small earth-station size.

In wireless systems, multiple users share the same bandwidth. Channel sharing through fixed-allocation, demand assigned or random-allocation modes is known as multiple access. Two of the more commonly known basic multiple-access techniques include time division multiple access (TDMA) and code division multiple access (CDMA).

Figure 1:
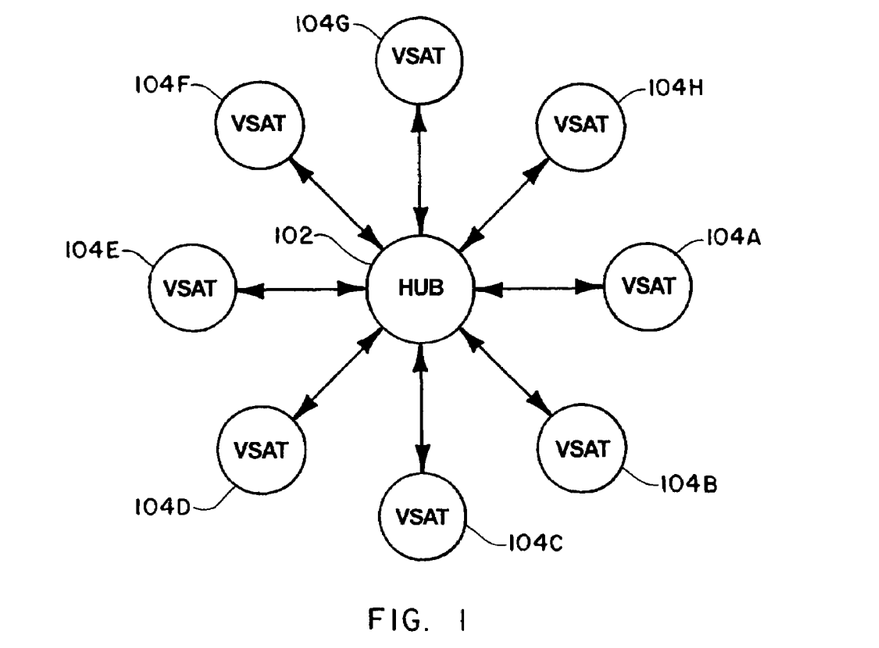
FIG. 1 illustrates a VSAT system in a star topology.

VSAT type systems have traditionally implemented TDMA using time division multiplexed (TDM) mode. Such systems generally are used for low speed (300 bps to 19,200 bps) data communications such as credit card processing and verification, point-of-sale inventory control and general business data connectivity. A typical TDM/TDMA network, when implemented in a star topology (FIG. 1), uses a large satellite hub system that manages all network terminal access and routing. Data is transmitted to and from the hub 102 in short bursts on satellite channels that are shared with a number of other VSAT terminals 104A-104H. The hub 102 communicates with these VSAT terminals 104A-104H over a higher speed outbound TDM satellite carrier. The terminals 104A-104H transmit back to the hub 102 on assigned inbound carriers using TDM protocols. Such a combination enables a predetermined number of slots in time each second that each terminal 104A-104H can transmit data. In addition, more or less time can dynamically be assigned to the terminals 104A-104H based upon each terminal's individual requirements.

In contrast, in a CDMA type system a user's station signal is multiplied by a unique spreading code at a high speed to be spread in a wide frequency band. Thereafter, the signal is transmitted to a transmission path. In a receiving side, the signal that was multiplexed by the spreading code is subjected to a despreading process to detect a desired signal. Signal detection is based on a unique spreading code assigned to a user's station. If despreading is carried out with reference to a particular code used to spread a transmission signal, a user's station signal is correctly reproduced.

Regardless of the access technique used, increased efficiency and lower cost is a primary goal. Accordingly, efficiencies in bandwidth may be realized using techniques such as crowding of adjacent channels, frequency re-use, and increasing of data rates, generally resulting in an increased amount of data traveling through the limited amount of available bandwidth. Unfortunately, however, such techniques introduce a significant amount of interference which must be cancelled. Known interference cancellation approaches exist for CDMA applications and may broadly be categorized into successive and parallel.

The successive approach generally requires highly accurate estimation of the received signal amplitudes as well as sorting the signals in decreasing order according to the powers. An alternative approach, parallel cancellation, subtracts off all the users' signals from all of the others and then the required data is detected. The parallel method outperforms the successive scheme when the users are received with equal strength, but at the expense of higher hardware complexity.

It is to be noted that, while similarities exist between a highly bandwidth-efficient satellite system and the problem of multi-user detection of spread-spectrum CDMA signals, all heretofore known detection methods utilize code sequences that are assigned to the different CDMA users and are therefore known beforehand. Unfortunately, such data is not available in a narrowband system, such as TDMA, making the problem of interference cancellation inherently more difficult.

Accordingly, there is a need for a system in narrow band type satellite applications that provides for efficient utilization of available bandwidth using a compensation scheme that eliminates interference and increases spectral efficiency.

SUMMARY OF THE INVENTION

Briefly, the present invention relates to a satellite communications system and method for achieving efficient utilization of available bandwidth for satellite applications such as fixed wireless, mobile satellite systems and other narrowband type applications. A decision-feedback scheme is used iteratively for interference cancellation to enable efficient use of the available bandwidth using techniques such as crowding of adjacent channels, frequency re-use, and increasing the data rates.

In a particular embodiment of the present invention, a matched-filter bank is used to receive signals and provide initial estimates of data for calculating the zeroth iteration of interference estimate. The result is subtracted from the matched-filter outputs to generate a new, more accurate, approximation of the data. These more accurate data estimates are used to reconstruct and cancel the interference until the desired channel is obtained. In particular, interference generating (I.G.) processors receive the first calculated estimated interference signals from the filter bank. The I.G. processors then generate interference signals corresponding to the calculated estimated data symbols. Interference estimating (I.E.) processors receive the estimated data signals from the I.G. processors and calculate subsequent estimated interference signals. These estimated interference signals are then input into the I.G. processors, and are then subtracted from the estimated data signals to output relatively more accurate estimated data signals. The process is repeated iteratively until the performance advantage is not commensurate with the computational load required to obtain it.

BRIEF DESCRIPTION OF THE DRAWINGS

The invention is pointed out with particularity in the appended claims. However, other features of the invention will become more apparent, and the invention will be best understood by referring to the following detailed description in conjunction with the accompanying drawings, in which:

DETAILED DESCRIPTION OF THE INVENTION

The present invention relates to a satellite communications system and method for achieving efficient utilization of available bandwidth for satellite applications such as fixed wireless, mobile satellite systems and other narrow-band type applications. In particular, a decision-feedback scheme is used iteratively for interference cancellation to enable efficient use of the available bandwidth using techniques such as crowding of adjacent channels, frequency re-use, and increasing the data rates. A particular advantage of such a system is the ability to eliminate interference, such as adjacent channel interference (ACI), that may be introduced during, for example, channel crowding, thereby resulting in a roughly 35% to 40% higher spectral efficiency. For example, the present embodiment enables a satellite system to operate at a bandwidth efficiency level of 2.41 bits-per-second/Hz with minimum additional energy requirement in the signal-to-noise ratio range of interest. This corresponds to an approximately 40% improvement in spectral utilization over current systems that employ similar modulation techniques.

Figure 2:
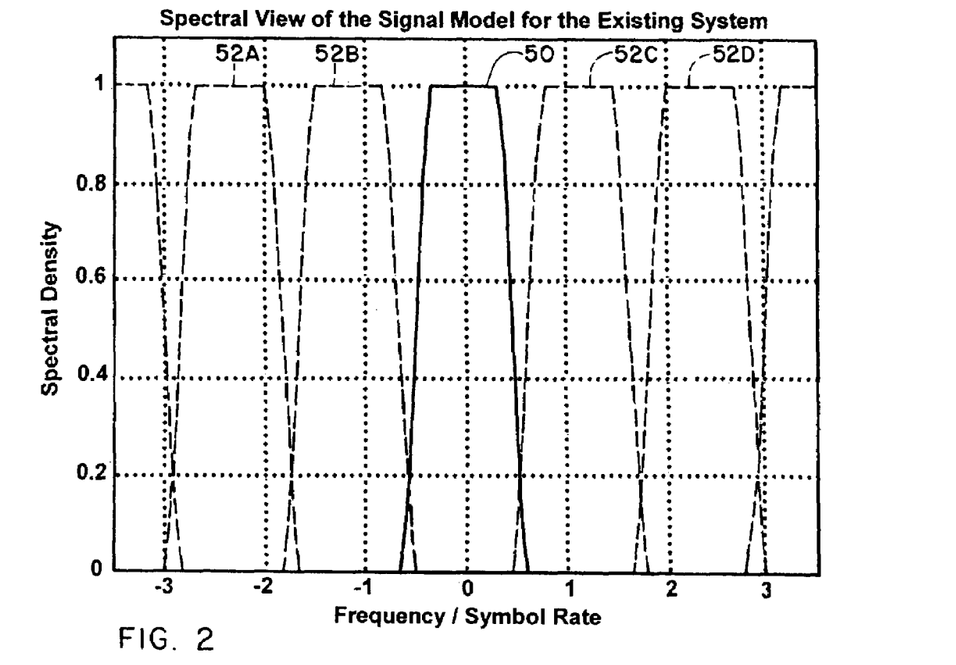
FIG. 2 illustrates a spectral view of a signal model for known systems.
Figure 3:
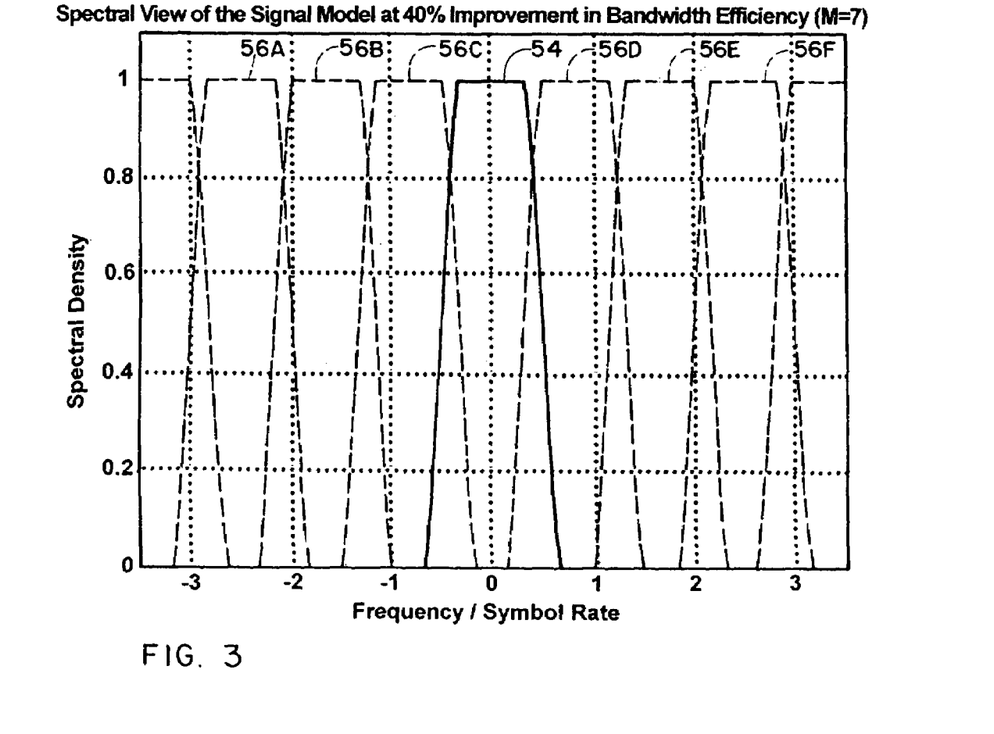
FIG. 3 illustrates a spectral view of a signal model in accordance with the present invention.

As shown in FIG. 2, existing systems have very little signal overlap and therefore suffer minimal degradation in performance. The desired channel 50, which is shown in solid lines, is quite clearly easily distinguished from adjacent channels 52A-52D and may be isolated easily. However, bandwidth utilization in known systems is inefficient. In contrast, as shown in FIG. 3, the present embodiment when using channel crowding, has significantly increased efficiency in bandwidth utilization. In particular, FIG. 3 shows a 40% improvement in bandwidth efficiency over existing systems. The greater efficiency also leads to a greater degree of signal overlap. As shown in FIG. 3, the desired channel 54 overlaps to a much greater degree with adjacent channels 56A-56F, thus requiring interference cancellation to enable isolation of the desired signal. It is to be noted that the gains in bandwidth efficiency outweigh the extra processing power required to eliminate ACI.

Figure 4:
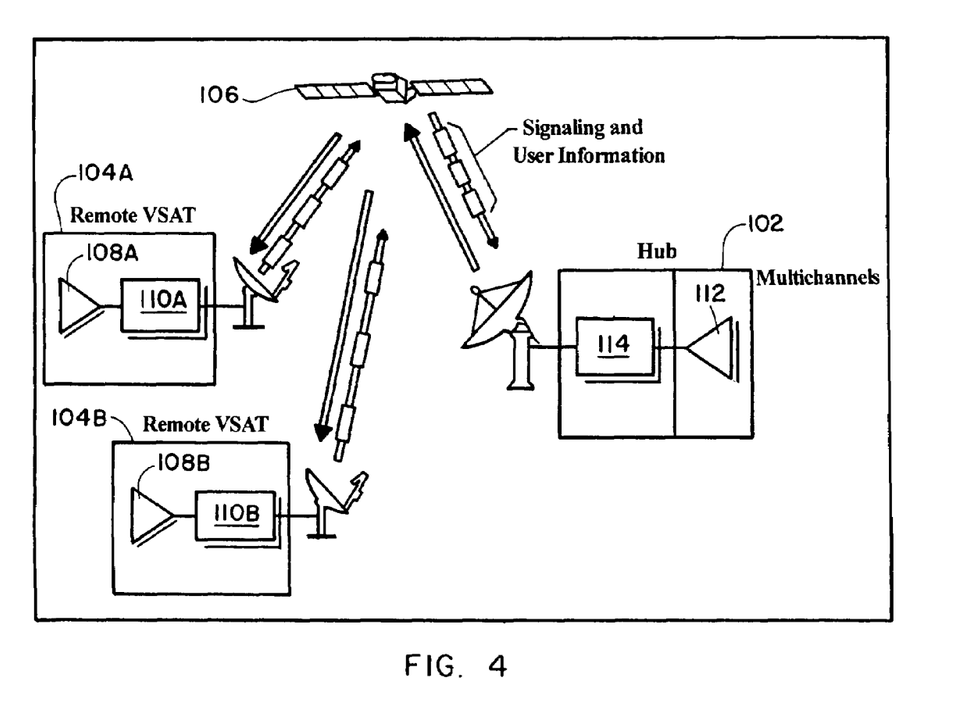
FIG. 4 is a diagram of an exemplary VSAT system communicating in a TDM/TDMA mode in accordance with the present invention.

Turning now FIG. 4, there is illustrated an exemplary VSAT system communicating in a TDM/TDMA mode for providing the interference cancellation features as described above. It is to be noted that the principals embodied in the present embodiment may also be applied to other satellite communications systems as well. As shown in the figure, the VSAT system, such as available from Hughes Network Systems, includes a central hub station 102 that controls one or more earth stations 104A-104B located on customers' premises. The earth stations 104A-104B and the central hub station 102 communicate with each other using a geosynchronous satellite 106. Each of the earth stations 104A-104B has a receiver 108A-108B for receiving and decoding signals received from the satellite 106 and transmitters 110A-110B for transmitting data to the satellite 106. The hub, or base station, station 102 similarly includes a receiver 112 for receiving and decoding signals received from the satellite 106 and a transmitter 114 for transmitting data to the satellite 106.

Figure 5:
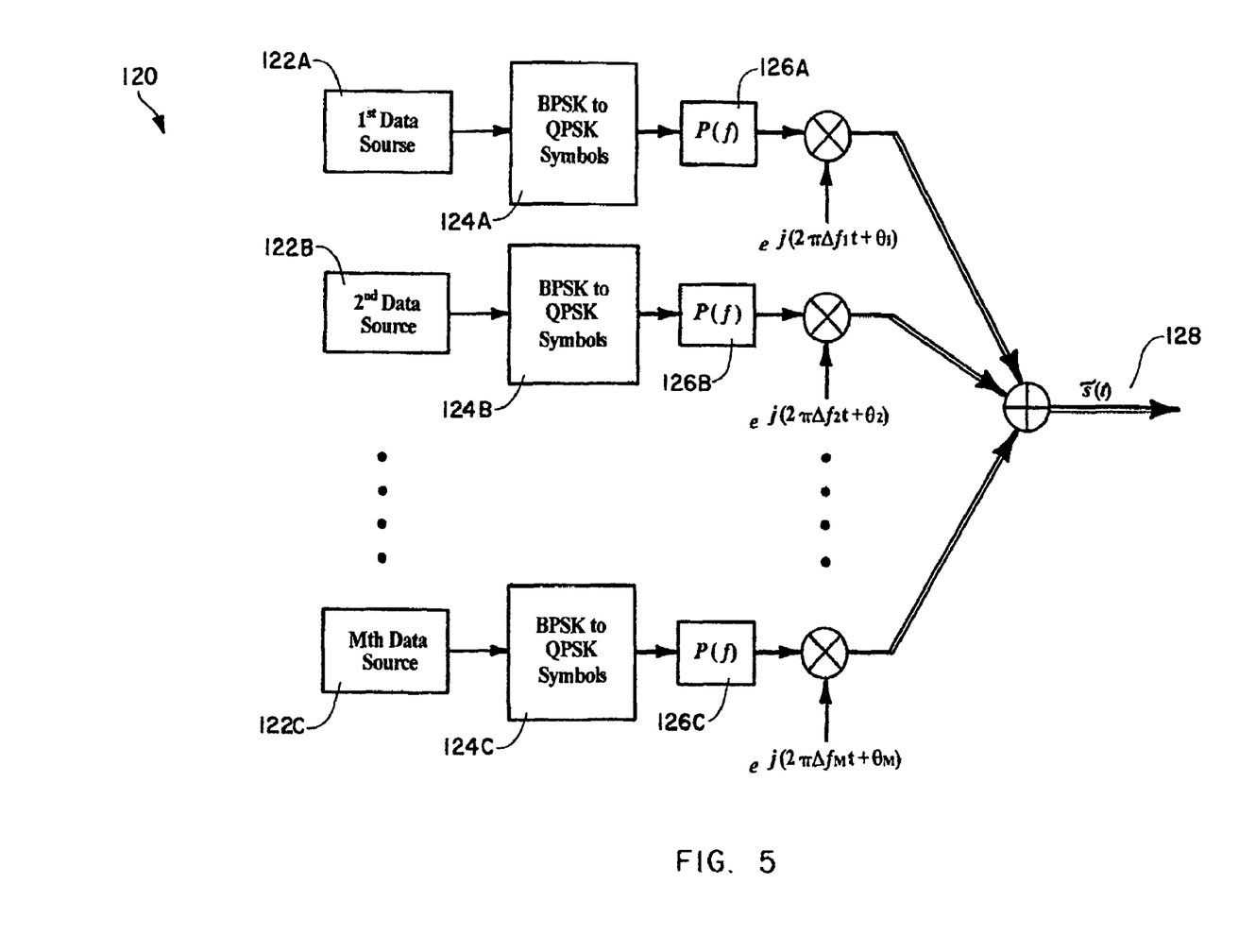
FIG. 5 is a schematic diagram of an exemplary ACI transmitter model in accordance with the present invention.

Turning to FIG. 5, an exemplary ACI transmitter model 120 is shown which may be representative of the earth station transmitters 110A-110B and the hub transmitter 114. The transmitter 120 receives data from a first source 122A to an Mth source 122C. Converters 124A-124C convert the data from a binary phase shift keying (BPSK) signal to a quadrature phase shift keying (QPSK) signal. The resultant frequency domain pulse 126 is interleaved and transmitted as signal s(t) 128. The signal s(t) 128 which models the situation of adjacent channel interference caused by signal crowding, consists of the signal in noise as $$r(t) = s(t) + n(t)$$

The n(t) is the standard additive white gaussian noise (AWGN) with single-sided power spectral density level of $N_0$ (Watts/Hz). The signals s(t) models the situation of ACI in which there are M adjacent data sources that are identical and independent. Each source transmits a QPSK signal at the rate of $T_s^{-1}$ with an arbitrary unit-energy pulse shape p(t). The signal is described in complex form as $$s(t) = Re\{\tilde{s}(t)e^{j2\pi f_c t}\}$$

where $f_c$ is the carrier frequency and s(t) is the baseband complex envelope of the signal and is mathematically expressed as $$\tilde{s}(t) = \sum_{m=1}^{M} \sum_{k=-\infty}^{\infty} \left[ a_{m,k} p(t - kT_s - \varepsilon_m T_s) e^{j(2\pi \Delta f_m t + \theta_m)} \right]$$

The data streams $\{a_{m,i}; m=1, \ldots, M\}$ consist of QPSK symbols taking on the equilikely values ($\pm 1 \pm j$) and are statistically related as $$E\{a*_{m,i} a_{n,j}\} = \begin{cases} 2, & m=n, i=j \\ 0, & \text{otherwise} \end{cases}$$

Assuming that M is an odd integer and that the desired center, or (M+1)/2-th, channel 54 (FIG. 3) conveys the desired data and that the other signals ((M−1)/2 ones on either side) are viewed as being adjacent-channel interferers, namely $\Delta f_1 = < \ldots < \Delta f_{(m+1)/2} < \ldots < \Delta f_M$. The present embodiment is used when the channel spacing values, compared with that of the center channel, are small enough to cause large amounts of overlap in the spectra (FIG. 3). Furthermore, in practical systems, these channels are equally spaced in frequency, say by $\Delta f$. In terms of the above, then $$\Delta f_m = \left(m - \frac{M+1}{2}\right)\Delta f; \quad m = 1, 2, \ldots, M$$

It is to be noted that M should not be interpreted as being the number of channels in the entire available bandwidth. Instead, it is the number of channels that the receiver wishes to process jointly to announce a decision regarding the desired data stream. Although the use of guard bands is known when separating channels, their use consumes a non-trivial amount of bandwidth, thereby decreasing spectral efficiency. Therefore, in the absence of an installed guard band, the outermost or "edge" channels, i.e., 1st and Mth, will always have interference. However, as described further below, the present embodiment does not require that the receiver compensate for these edge channels. For example, as shown in FIGS. 2 and 3, M is chosen to be seven. As such, the receiver processes seven channels in the presence of two additional signals, shown in the figure by the dash-dot curves.

Two criteria of performance are considered. The first is the bandwidth efficiency, $\eta$, in bits-per-second/Hz defined as the ratio of the data rate to the bandwidth used. This quantity is obtained in this case as $$\eta^\Delta = \frac{2}{\Delta f T_s}$$

The second is the energy efficiency defined as the signal-to-noise ratio per bit required to achieve a specific bit error probability $P_b(E)$ of the desired channel. Other measures of performance may also be used, such as symbol error probability and word error probability.

It can be seen that the interference-free performance is $$P_b(E) = Q\left(\sqrt{\frac{2E_b}{N_0}}\right)$$

where $E_b$ is the average bit energy and $Q(x)$ is defined as the Gaussian probability integral $$Q(x) \triangleq \int_x^\infty \frac{1}{\sqrt{2\pi}} e^{-\frac{y^2}{2}} dy$$

The performance indicated by the above equations is used as a benchmark to quantify the ability of the proposed receivers to suppress interference.

Figure 6:
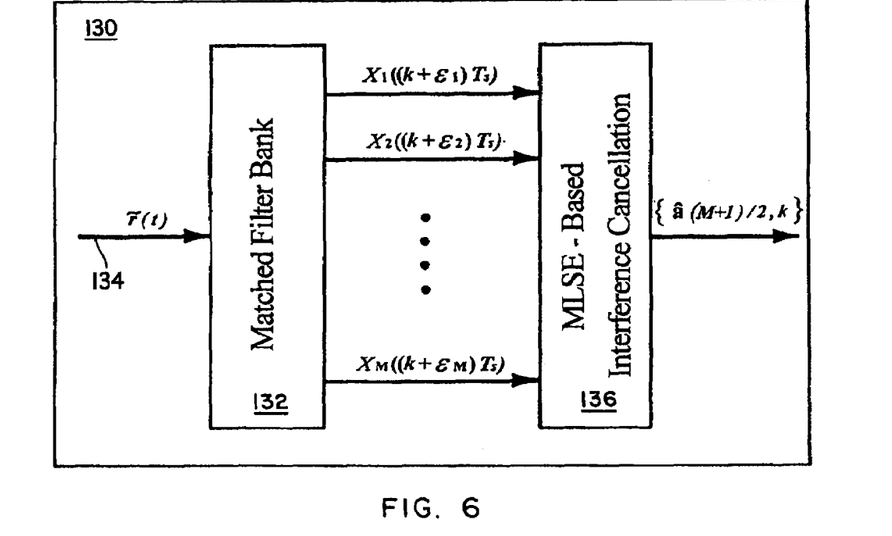
FIG. 6 is a block diagram of an exemplary ACI receiver model in accordance with the present invention.

Turning to FIG. 6, an exemplary optimal receiver model 130 is shown which may be used in the earth station receivers 108A-108B and the hub receiver 112. The receiver 130 includes a matched-filter bank 132 which receives data, such as the signal r(t) 134. Outputs from the filter bank 132 are then input into a maximum-likelihood sequence estimation (MLSE) receiver 136, which is used for interference cancellation, as discussed further below. It is to be noted that while the present embodiment may be located in the earth station receivers 108A-108B, to maintain reduced cost and complexity in the earth stations, the present embodiment is preferably situated in the hub receiver 112.

From statistical theory of hypothesis testing, one may derive the optimum solution that minimizes sequence error probability based on the average likelihood-ratio function (ALF). The likelihood function conditional on knowing a given signal in AWGN is then obtained as $$\Lambda(r(t)) = \exp\left(-\frac{1}{N_0}\int_{-\infty}^{\infty}|\tilde{r}(t) - \tilde{s}(t)|^2 dt\right)$$

where r(t) is the baseband complex envelope of the received waveform. Thus, $$\ln(\Lambda(\tilde{r}(t))) =$$

$$-\frac{1}{N_0}\int_{-\infty}^{\infty}\left|\tilde{r}(t) - \left[\sum_{m=1}^{M}\sum_{k=-\infty}^{\infty}a_{m,k}p(t - kT_s - \varepsilon_m T_s)e^{j(2\pi\Delta f_m t + \theta_m)}\right]\right|^2 dt =$$

$$-\frac{1}{N_0}\int_{-\infty}^{\infty}|\tilde{r}(t)|^2 dt +$$

$$\frac{1}{N_0}2\mathrm{Re}\left\{\int_{-\infty}^{\infty}\tilde{r}(t)\left[\sum_{m=1}^{M}\sum_{k=-\infty}^{\infty}a_{m,k}p(t - kT_s - \varepsilon_m T_s)e^{j(2\pi\Delta f_m t + \theta_m)}\right]^*\right\}dt -$$

$$\frac{1}{N_0}\int_{-\infty}^{\infty}\left|\sum_{i=1}^{M}\sum_{k=-\infty}^{\infty}a_{m,k}p(t - kT_s - \varepsilon_m T_s)e^{j(2\pi\Delta f_m t + \theta_m)}\right|^2 dt$$

By absorbing terms that are independent of the sought symbols and after some algebraic manipulations, maximizing the ALF over the information symbols is equivalent to maximizing the quantity $J(a_1, a_2, \ldots a_M)$ of the metric, defined as $$J(a_1, a_2, \ldots, a_m) \triangleq 2\mathrm{Re}\left\{\sum_{k=-\infty}^{\infty}\left[\sum_{m=1}^{M}a*_{m,k} x_m((k + \varepsilon_m)T_s)\right]\right\} -$$

$$\sum_{k=-\infty}^{\infty}\sum_{l=-\infty}^{\infty}\left[\sum_{m=1}^{M}\sum_{n=1}^{M}a_{m,k}C_{m,n}((k + \varepsilon_m)T_s, (l + \varepsilon_n)T_s)a*_{n,l}\right]$$

Figure 7:
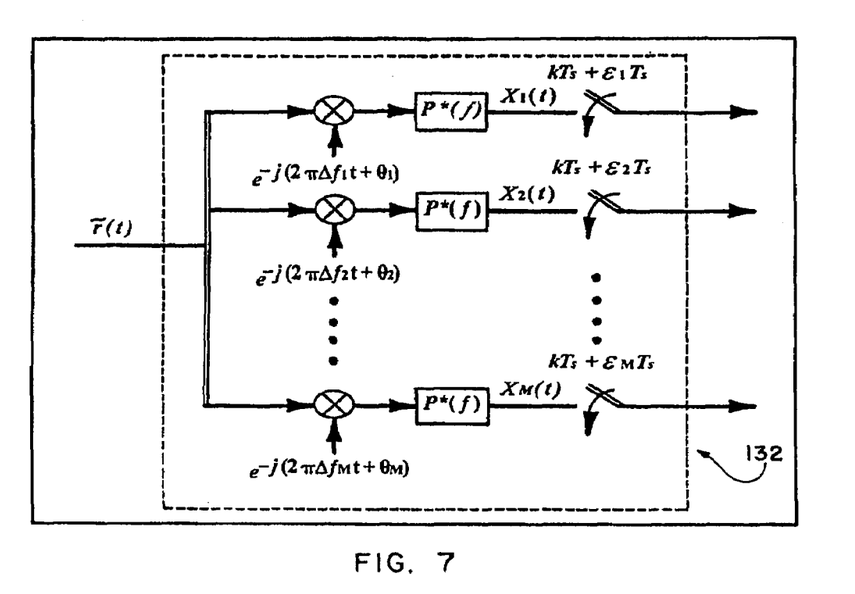
FIG. 7 is a block diagram of an exemplary matched-filter bank used in the ACI receiver model of FIG. 6 in accordance with the present invention.

The above expression shows that $\{x_m((k+\epsilon)T_s); m=1, \ldots, M\}$ is a set of sufficient statistics which consists of an exemplary bank of matched filters, as shown in FIG. 7, matched to the modulating signal in each channel, then sampled at the symbol rate of $T_s^{-1}$. More generally defined as $$x_m(t)\triangleq\int_{-\infty}^{\infty}\tilde{r}(a)e^{-j(2\pi\Delta f_m a + \theta_m)}p*(a-t)da$$

and also $$C_{l,j}(t_1, t_2) \triangleq \left[\int p*(a)p(a + t_2 - t_1)e^{-j2\pi(\Delta f_j - \Delta f_l)a}da\right] \times$$

$$\exp(-j(2\pi(\Delta f_j - \Delta f_l)t_2 + (\theta_j - \theta_l))$$

The function of the optimal rule, or the MLSE receiver 136, is to determine the sequence of information symbols ($a_1$, $a_2, \ldots a_M$) that maximizes the metric shown above. If there are N symbols in a frame, then the most straightforward way of implementing the optimum receiver requires $4^{MN}$ computations of the metric. However, this procedure can be implemented in the most efficient way, by generalizing the modified Viterbi Algorithm (VA) of G. Ungerboeck, "Adaptive Maximum-Likelihood Receiver for Carrier-Modulated Data Transmission Systems," IEEE Transactions on Communications, pp. 624-636, May 1974. Accordingly, the metric shown above can be made recursive by the relation:

$$J_p(a_{1,p}, a_{2,p}, \ldots, a_{M,p}) = J_{p-1}(a_{1,p-1}, a_{2,p-1}, \ldots, a_{m,p-1}) +$$
$$\text{Re}\left\{\sum_{m=1}^{M} a*_{m,p}\left[2x_m((p+\varepsilon_m)T_s) - \sum_{n=1}^{M} C_{n,m}((p+\varepsilon_n)T_s), (p+\varepsilon_m)T_s\right.\right.$$
$$\left.\left. a_{n,p} - 2\sum_{n=1}^{M}\sum_{k\leq p-1} C_{n,m}((k+\varepsilon_n)T_s, (p+\varepsilon_m)T_s)a_{n,k}\right]\right\}$$

Equivalently, the channel whose impulse response spans L symbols can be viewed as a finite-state discrete-time machine where the state at discrete time i is defined as $$S_i \triangleq (a_{1,i-1}, \ldots, a_{i-L}; a_{2,i-1}, \ldots, a_{2,i-L}; \ldots; a_{M,i-1}, \ldots, a_{M,i-L})$$

The VA then tracks the paths through the trellis and provides the solution to the problem of maximum-likelihood estimate of the state sequence. Thus, it is clear that the trellis has a maximum of $4^{ML}$ states. Note that the efficiency of this modified VA stems from the fact that maximizing the likelihood function requires computing $N4^{ML}$ instead of $4^{MN}$ metrics, wherein L is typically much smaller than N. Thus, eventhough the complexity remains exponential in the number of channels, making the optimum rule computationally intensive, the state complexity becomes independent of N. It is to be noted that reduced-complexity versions of the vector VA, which use decision-feedback on a per-survivor basis, may also be used.

In another embodiment of the embodiment, a simpler cancellation structure is provided wherein the complexity does not grow exponentially with the number of channels. In particular, a suboptimal cancellation structure is used to reduce the complexity and computationally intensive nature of the VA.

Before providing a suboptimal cancellation structures, the effective channel that appears at the output of the matched-filter bank, $\{x_m(t); m=1, 2, \ldots, M\}$, is characterized to yield $$x_m(t) = \left[\sum_{n=1}^{M}\sum_{i=-\infty}^{\infty} a_{n,i}C_{n,m}((i+\varepsilon_n)T_s, t)\right] + n_m(t)$$

From the above equation it is clear that the equivalent lowpass interference channel is described by the previously defined impulse response $C_{l,j}(t_1,t_2)$, which can be equivalently represented in the frequency domain as $$C_{ij}(t_1,t_2) \triangleq \int\int P(f)P^*(f-(\Delta f_j-\Delta f_i))e^{j2\pi f(t_2-t_1)}df \times$$
$$\exp(-j(2\pi(\Delta f_j-\Delta f_i)t_2+(\theta_j\theta_i)))$$

This function represents the effective channel impulse response at the output of the jth matched-filter when excited by the lth data source. It consists of the cascade of the pulse-shaping filter and the complex multiplier at the transmitter side, the channel, and the matched-filter at the receiver. It is to be noted that the impulse response in this case is time-varying, a condition that results due to the presence of complex-exponential multipliers (or frequency shifters) in the system. As the channel spacing is increased, the magnitude of the impulse response decreases but its duration is increased, making the channel have a larger memory span.

From above, $$n_m(t) \triangleq \int \tilde{n}(a)p^*(a-t)e^{-j(2\pi\Delta f_m a + \theta_m)}da$$

wherein, the $\{n_m(t); m=1, 2, \ldots, M\}$ is a set of zero-mean complex Gaussian random processes with covariance $$E\{n^*_i(t)n_j(t')\} = N_0 C_{ij}(t,t')$$

Several assumptions are made to simplify notation. First, in regards to the pulse shaping, it is assumed that the pulse p(t) selected satisfies the Nyquist criterion of zero inter-symbol interference. This criterion is expressed in time as $$\int_{-\infty}^{\infty} p*(t)p(t+nT_s)dt = \begin{cases} 1, & n=0 \\ 0, & \text{otherwise} \end{cases}$$

or in frequency as $$\frac{1}{T_s}\sum_{n=-\infty}^{\infty}\left|P\left(f+\frac{n}{T_s}\right)\right|^2 = 1$$

This states that the aliased or folded version of the auto-power spectrum associated with the selected pulse must be flat. (The aliased version is what results when replicating the function at multiples of the symbol rate $T_s^{-1}$.) Note that the root-raised cosine pulse, which is a practical and bandwidth-efficient choice, is defined in the frequency domain as $$P(f) = \begin{cases} 1, \\ \sqrt{\frac{1}{2}\left[1-\sin\pi T_s\left(f-\frac{1}{2T_s}\right)/\beta\right]}, \\ 0, \end{cases}$$

$0 \leq |f| \leq (1-\beta)/2T_s$ $(1-\beta)/2T_s \leq |f| \leq (1+\beta)/2T_s$ otherwise where β is the roll-off parameter. Second, the spectral overlap of these channels does not exceed 50%. This, along with practical values of the roll-off parameter, indicates that the ACI on a given channel results from one adjacent interferer on either side. Third, it is assumed that the ACI extends over a finite time interval spanning L symbols. The actual value of L is directly related to the amount of spectral overlap that exists between the channels. From basic principles of Fourier transforms, the value of L, which can be thought of as the memory of the interference channel, is larger for smaller overlap.

Fourth, it is assumed that the receiver is able to maintain phase coherence and time synchronism. For the time synchronism situation, a situation representative of a satellite downlink application, it is assumed that the relative time delays are zero. Based on the above set of assumptions, the matched-filter statistic is described as $$x_m(kT_s) = a_{m,k} + \sum_{i=-L}^{L} a_{m-1,k-i} C_{m-1,m}((k-i)T_s, kT_s) +$$

$$\sum_{i=-L}^{L} a_{m+1,k-i} C_{m+1,m}((k-i)T_s, kT_s) + n(kT)$$

The first term on the right-hand side of the above equation is the desired information symbol; the second term is the ACI contribution from the left channel; while the third term is the ACI contribution from the right channel. The ACI is determined by the symbol-spaced samples of the cross-correlation between transmit and receive filters. The set $\{n_m(kT_s); m=1, 2, \ldots, M\}$ has elements that are statistically correlated across different m's but independent for a specific m.

Figure 8:
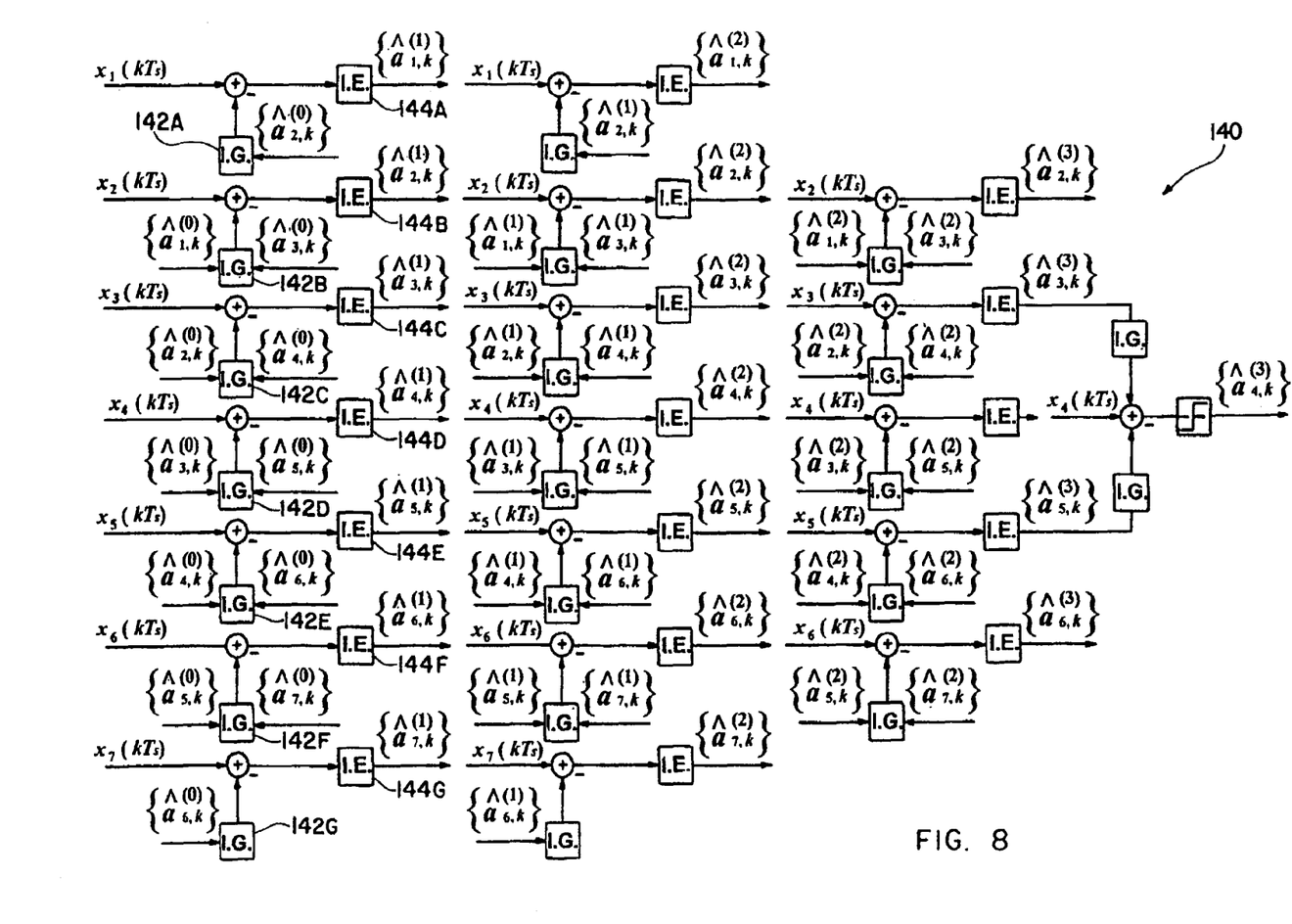
FIG. 8 is a block diagram of an exemplary subtractive interference canceller used in the ACI receiver of FIG. 6 in accordance with the present invention.

Referring to FIG. 8, the subtractive interference canceller 140 in accordance with the present embodiment is shown. In particular, the characteristics of the interference channel is used to provide progressively improved estimation of the interference that exists at the output of the matched-filters. These interference estimates are then subtracted to suppress their effect on the decision variables. The process of regenerating the interference requires the knowledge of the data symbols transmitted by the adjacent interferers.

More specifically, the present embodiment includes a system which uses the matched-filter bank 132 (FIG. 7) to provide the initial estimates of the data and to calculate the zeroth iteration of interference estimate. The result is subtracted from the matched filter outputs to make a new approximation of the data. These more accurate data estimates are used to reconstruct and cancel the interference. It is to be noted that the matched filter bank of FIG. 7 is shown by way of example only and that other similar filter banks may also be used.

Figure 9:
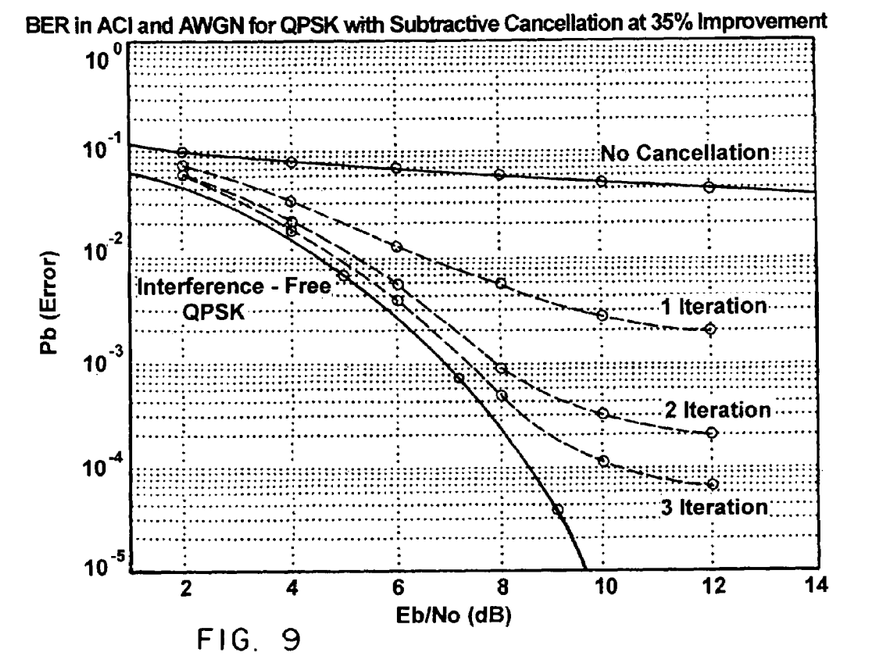
FIGS. 9 and 10 are charts illustrating bit error rate performances at improved spectral efficiencies.
Figure 10:
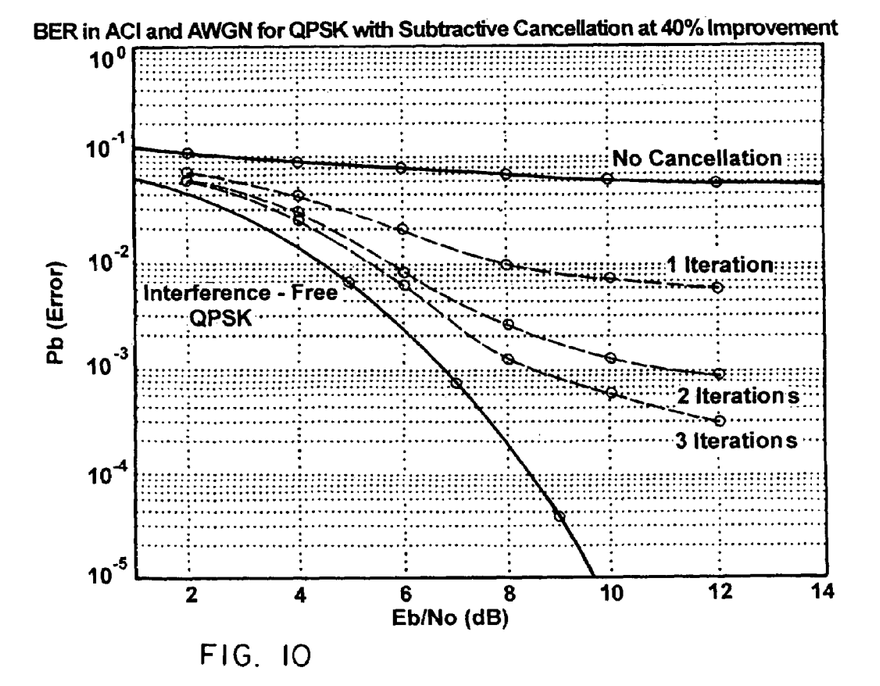

As mentioned above, the process is repeated iteratively until the performance advantage is not commensurate with the computational load required to obtain it. As shown in FIGS. 9 and 10, it can be seen that each iteration of the interference cancellation system results in decreased bit-error rate. In particular, FIG. 9 illustrates the bit-error rate performance at a 35% improvement in spectral efficiency and FIG. 10 illustrates the bit-error rate performance at a 40% improvement in spectral efficiency after the first three iterations of the interference cancellation system of the present embodiment. As such, it can be seen that the initial iteration provides the greatest improvement and subsequent iterations provide increasingly less improvement.

Referring once again to FIG. 8, the interference generating (I.G.) processors 142A-142G receive the first calculated estimated interference signals from the filter bank 132. The I.G. processors 142A-142G then generate interference signals corresponding to the calculated estimated interference signals. The I.G. processors 142A-142G then subtract the interference signals from the estimated data signals and output relatively more accurate estimated data signals. The I.E. processors 144A-144G receive the estimated data signals from the I.G. processors 142A-142G and calculate subsequent estimated interference signals. These estimated interference signals are then input into the I.G. processors 142A-142G and the process is repeated iteratively until the performance advantage is not commensurate with the computational load required to obtain it.

Mathematically speaking, the initial or zeroth-iteration data estimate, $\hat{a}_{m,k}^{(0)}$, as provided by the filter bank 132 is $$\hat{a}_{m,k}^{(0)} = \text{Decision}(x_m(kT_s)); Th_0)$$

where Decision (x;Th) is a function that provides hard decision on the real and imaginary parts in parallel. Namely, if z=x+jy then $$\text{Decision}(z;Th) = \text{Decision}(x;Th) + j\text{Decision}(y;Th)$$

and $$\text{Decision}(x; Th) \triangleq \begin{cases} +1, & x > Th \\ 0, & |x| \leq Th \\ -1, & x < -Th \end{cases}$$

Note that Decision (x;0)=sgn (x). The interference canceller uses these data estimates to reconstruct the interference as though these estimates were correct as $$\hat{I}_m^{(l)}(kT_s) = \sum_{i=-L}^{L} \hat{a}_{m-1,k-i}^{(0)} C_{m-1,m}((k-i)T_s, kT_s) + \sum_{i=-L}^{L} \hat{a}_{m+1,k-i}^{(0)} C_{m+1,m}((k-i)T_s, kT_s)$$

Then, the first iteration estimates of the data are $$\hat{a}_{m,k}^{(1)} = \text{Decision}(x_m(kT_s) - \hat{I}_m^{(1)}(kT_s); Th_1)$$

and so on.

In general, the Ith iteration of this iterative algorithm acts on the sufficient statistics to produce the Ith estimates of the data as $$\hat{a}_{m,k}^{(l)} = \text{Decision}(x_m(kT_s) - \hat{I}_m^{(l)}(kT_s); Th_l)$$

where $$\hat{I}_m^{(l)}(kT_s) = \sum_{i=-L}^{L} \hat{a}_{m-1,k-i}^{(l-1)} C_{m-1,m}((k-i)T_s, kT_s)$$

$$+ \sum_{i=-L}^{L} \hat{a}_{m+1,k-i}^{(l-1)} C_{m+1,m}((k-i)T_s, kT_s)$$

This process is repeated (K−1) times for a Kth-iteration canceller, until finally $$\hat{a}_{\frac{(M+1)}{2},k}^{(K)} = \text{sgn}\left(x_{\frac{(M+1)}{2}}(kT_s) - \hat{I}_{\frac{(M+1)}{2}}^{(K)}(kT_s)\right)$$

After lth cancellations, the decision variable is expressed as $$\left(x_m(kT_s) - \hat{I}_m^{(l)}(kT_s)\right) =$$

$$a_{m,k} + \sum_{i=-L}^{L} \left(a_{m-1,k-i} - \hat{a}_{m-1,k-i}^{(l-1)}\right) C_{m-1,m}((k-i)T_s, kT_s) +$$

$$\sum_{i=-L}^{L} \left(a_{m+1,k-i} - \hat{a}_{m+1,k-i}^{(l-1)}\right) C_{m+1,m}((k-i)T_s, kT_s) + n_m(kT_s)$$

Based on the above equation, it is clear that the present embodiment attempts to cancel all of the interfering channels collectively from a particular channel. Furthermore, the effect of perfect cancellation at any iteration yields the optimum performance of the signal channel. In addition, if the decision device that is used to estimate interference is the standard sgn (x) then imperfect cancellation causes the interference to double in magnitude. The decision device used here, instead, allows for a "comfort" zone of one-sided length (Th) so that no decision is made in the region when the decision variable is of little reliability. It is to be understood that, for the purposes of this discussion, the threshold value (Th) has been coarsely optimized for different iterations via simulation and that analytical approaches, as shown in FIGS. 9 and 10 as a solid line, to determining soft-decision devices based on reliability information can further improve performance.

The embodiments described in the above detailed description are not intended to be limited to the specific form set forth herein, but on the contrary, they are intended to cover such alternatives, modifications and equivalents as can reasonably be included within the spirit and scope of the appended claims.

The present invention and its performance have been described primarily in association with the customary AWGN channel. It is however clear from concepts in this patent to extend it to the case of fading channel. This can be done for example by estimating the channel directly and incorporating this estimate into the reconstruction of the interference for subsequent cancellation.

In addition it was assumed that the receiver has knowledge of the signal parameters such as timing and phase for the subset of channels that are jointly processed. It can be easily extended to the practical ease where the receiver must provide accurate estimate of these parameters. One way of generating those estimates is by assigning some known symbols at the transmitter and cross-correlating against the waveform during that portion at the receiver.

In order to prevent the synchronizing sequence from being obscured by the adjacent channels, a system level mechanism is needed to ensure that only one user is transmitting during its known symbol period.

What is claimed is:

1. A system for enabling efficient utilization of available bandwidth through overlapping adjacent channels comprising:
   a receiver for receiving a waveform having data information and noise information, a filter bank adapted to receive and filter said waveform and output channel information, said channel information including a combination of data signals and adjacent channel interference signals, said filter bank further adapted to provide estimated data signals and to calculate estimated interference signals; and
   one or more interference generating processors adapted to receive said calculated estimated interference signals to enable said interference generating processor to generate interference signals corresponding to said calculated estimated interference signals, said interference generating processor further adapted to subtract said generated interference signals from said estimated data signals and to output subsequent relatively more accurate estimated data signals.

2. The system of claim 1, wherein said channel information includes interfering signals from different users using the same channel, said interference generating processors being adapted to receive and calculate estimated interference from the different users of the same channel to enable said interference generating processor to generate interfering signals corresponding to the interfering users.

3. The system of claim 1, comprising a decision device operable with said interference generating processors for estimating data signals in accordance with the relative ability of the information processors to cancel interference with the estimated interference signals.

4. The system of claim 3, wherein said decision device comprises a multi-level decision device comprising a one-sided length zone of the decision device such that no decision is made in a region where the decision variable is of diminished reliability.

5. The system of claim 1, comprising one or more interference estimating processors adapted to receive said relatively more accurate estimated data signals and to calculate subsequent estimated interference signals for input into said one or more interference generating processors.

6. The system of claim 5, wherein said relatively more accurate estimated data signals are fed back into said one or more interference generating processors for a predetermined number of iterations.

7. A method for enabling efficient utilization of available bandwidth through overlapping adjacent channels, comprising:
   receiving a waveform having data information and noise information;
   filtering the waveform and outputting channel information through a filter bank;
   producing estimated data signals corresponding to said channel information;
   calculating estimated interference signals corresponding to said channel information;
   generating interference signals corresponding to said calculated estimated interference signals; and
   subtracting said generated interference signals from said estimated data signals to provide relatively more accurate data signals.

8. The method of claim 7, further including the step of calculating subsequent estimated interference signals from said relatively more accurate data signals.

9. The method of claim 8, further including the step of feeding back said relatively more accurate data signals into said subtracting step a predetermined number of times.

10. The method of claim 9, further including the step of repeating said feed back step to output increasingly accurate estimated data signals.

11. A system for enabling efficient utilization of available bandwidth through overlapping adjacent channels, comprising:
   means for receiving a waveform having data information and noise information;
   means for filtering the waveform and outputting channel information through a filter bank;
   means for producing estimated data signals corresponding to said channel information;
   means for calculating estimated interference signals corresponding to said channel information;

means for generating interference signals corresponding to said calculated estimated interference signals; and means for subtracting said generated interference signals from said estimated data signals to provide relatively more accurate data signals.

12. The system of claim 11, further including means for calculating subsequent estimated interference signals from said relatively more accurate data signals.

13. The system of claim 12, further including means for feeding back said relatively more accurate data signals into said subtracting step a predetermined number of times.

14. The system of claim 13, further including means for repeating said feed back step to output increasingly accurate estimated data signals.

* * * * *